US007970286B2

(12) United States Patent
Maeda

(10) Patent No.: US 7,970,286 B2
(45) Date of Patent: Jun. 28, 2011

(54) OPTICAL TRANSMISSION DEVICE

(75) Inventor: Taizo Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/543,858

(22) Filed: Aug. 19, 2009

(65) Prior Publication Data

US 2010/0040373 A1 Feb. 18, 2010

Related U.S. Application Data

(63) Continuation of application No. PCT/JP2007/000262, filed on Mar. 19, 2007.

(51) Int. Cl.
*H04B 10/00* (2006.01)
(52) U.S. Cl. .................. 398/160; 398/157; 398/181
(58) Field of Classification Search .......... 398/157–160, 398/173–181
See application file for complete search history.

(56) References Cited

U.S. PATENT DOCUMENTS

| 6,819,479 B1* | 11/2004 | Islam et al. ............ 359/337 |
| 7,302,183 B2 | 11/2007 | Sekine |
| 2002/0054733 A1* | 5/2002 | Kagi et al. ............ 385/27 |
| 2003/0081283 A1 | 5/2003 | Ishizuka et al. |
| 2003/0223728 A1 | 12/2003 | Maeda et al. |
| 2004/0136053 A1* | 7/2004 | Sugiya ............ 359/337.1 |
| 2005/0158057 A1* | 7/2005 | Tomofuji et al. ............ 398/160 |
| 2005/0213978 A1* | 9/2005 | Yamashita et al. ............ 398/79 |
| 2006/0023298 A1 | 2/2006 | Ohshima et al. |
| 2006/0146397 A1* | 7/2006 | Aozasa et al. ............ 359/341.1 |

FOREIGN PATENT DOCUMENTS

| JP | 11-224967 | 8/1999 |
| JP | 2003-143629 | 5/2003 |
| JP | 2003-298529 | 10/2003 |
| JP | 2004-7058 | 1/2004 |
| JP | 2004-158652 A | 6/2004 |
| JP | 2005-204026 A | 7/2005 |
| JP | 2006-66862 | 3/2006 |

OTHER PUBLICATIONS

International Search Report for PCT/JP2007/000262, mailed May 15, 2007.
Japanese Notice of Rejection Ground, English-language Translation, mailed Apr. 5, 2011 for corresponding Japanese Application No. 2009-508688.

* cited by examiner

*Primary Examiner* — Dzung D Tran

(57) ABSTRACT

In a wavelength-division multiplexing communications system including a plurality of optical transmission devices having an optical amplifier, downstream optical transmission devices transmit gain wavelength characteristic information of an optical amplifier in each of the downstream optical transmission devices to an upstream optical transmission device. The upstream optical transmission device controls gain wavelength characteristics on the basis of the received gain wavelength characteristic information.

15 Claims, 16 Drawing Sheets

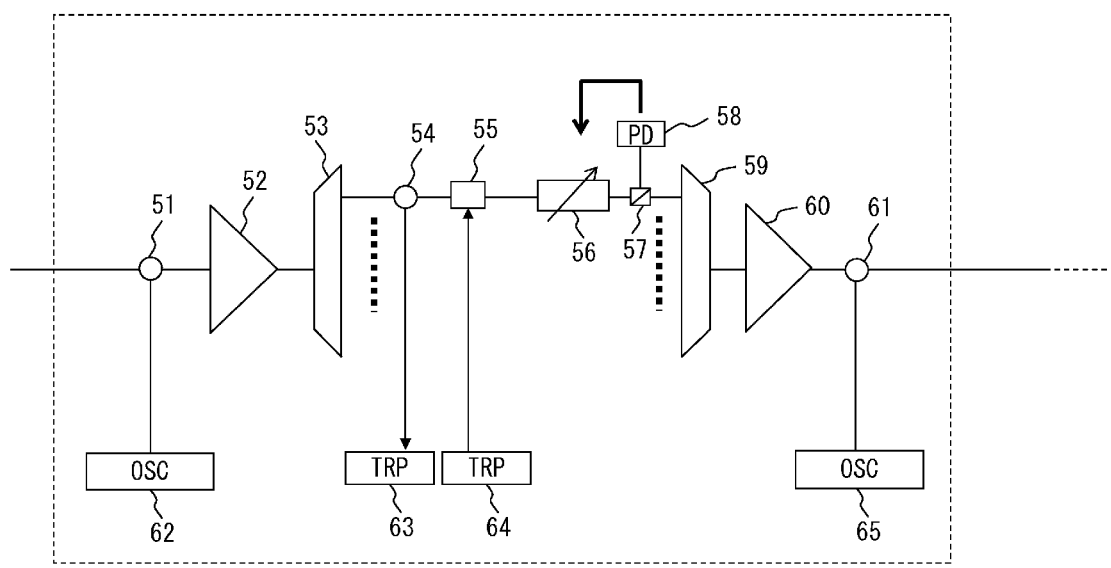
F I G. 1

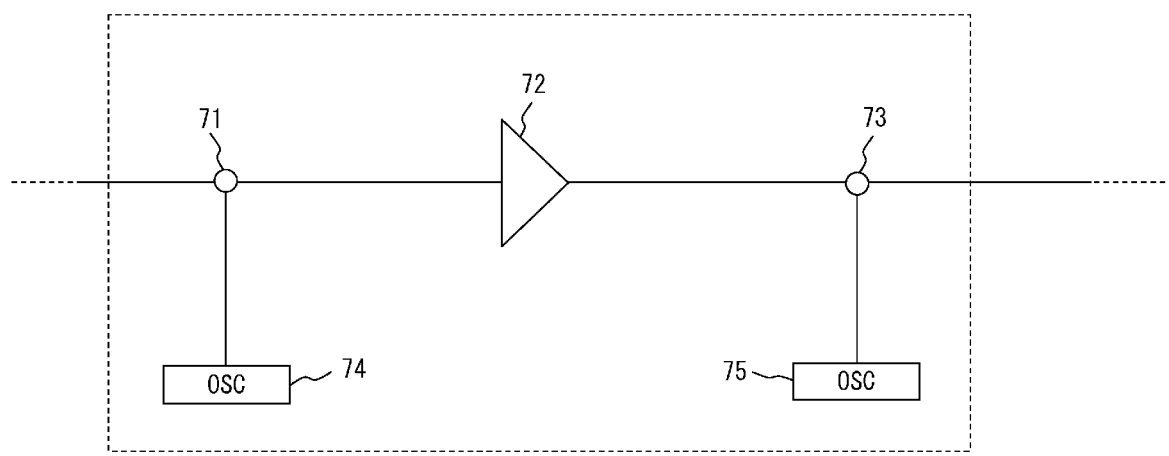
F I G. 2

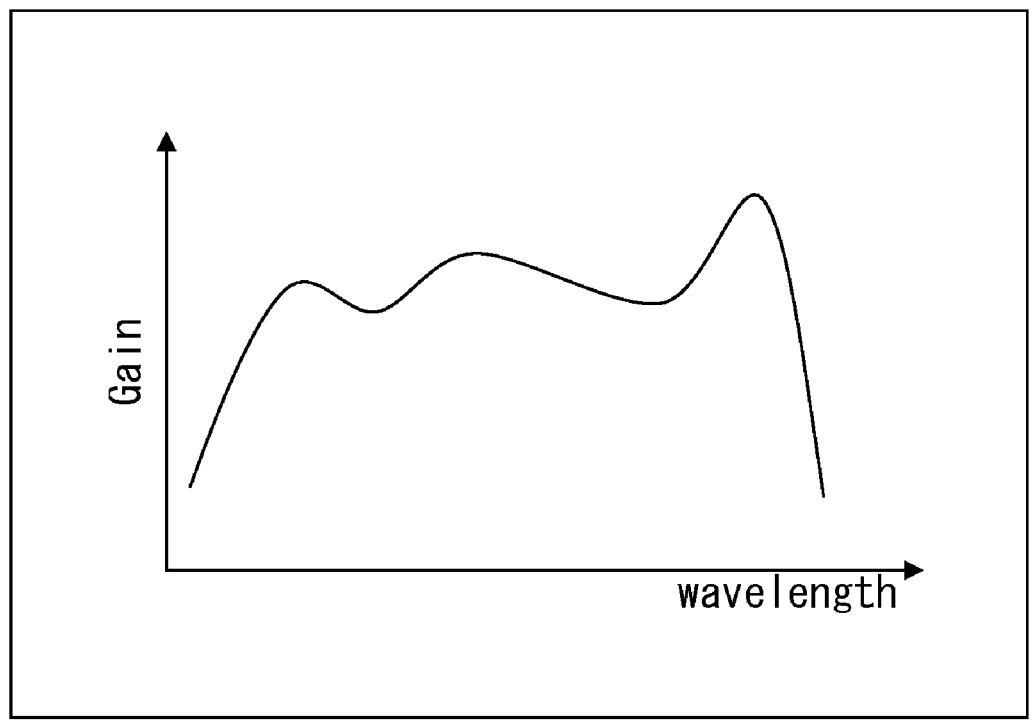
F I G. 4

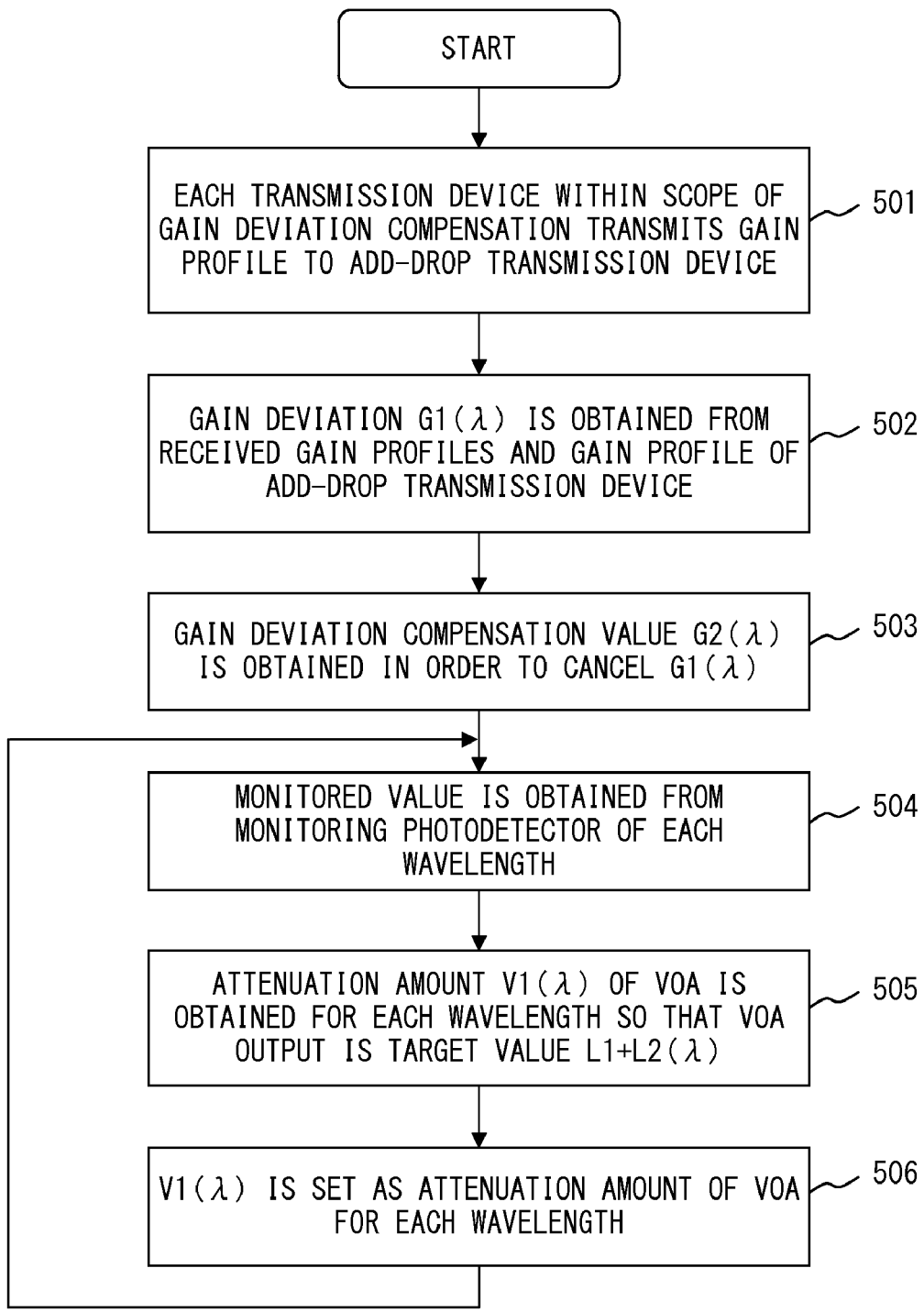
F I G. 5

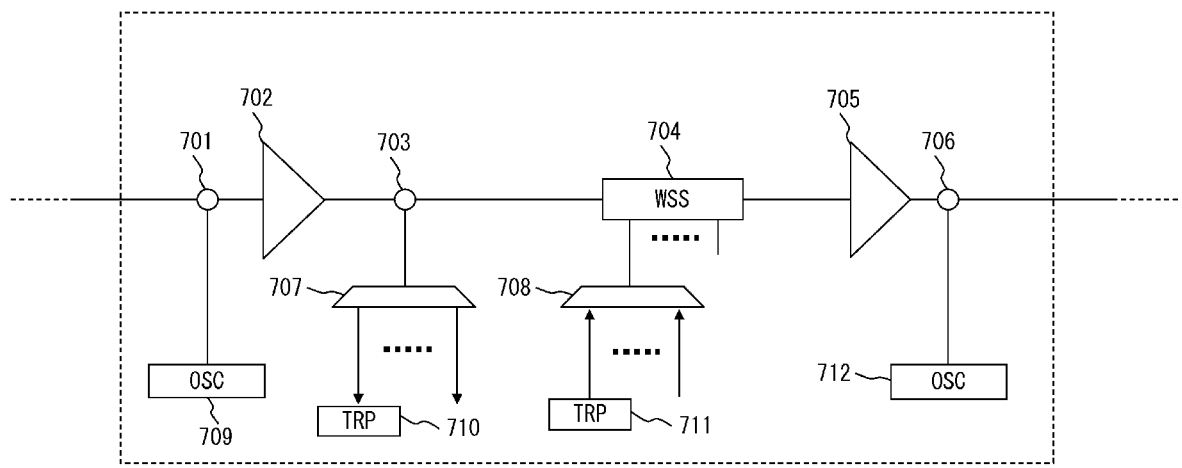
F I G. 7

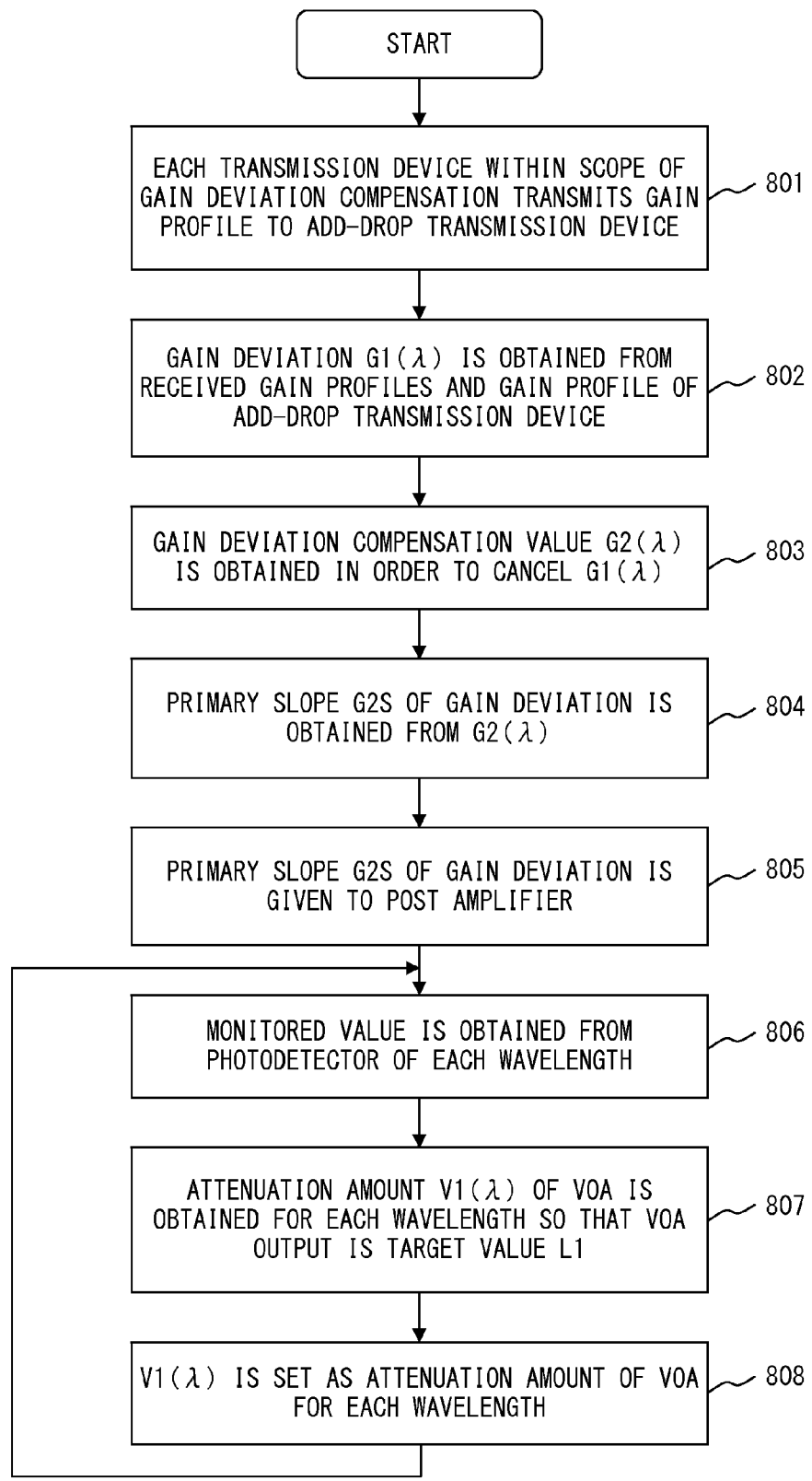
F I G. 8

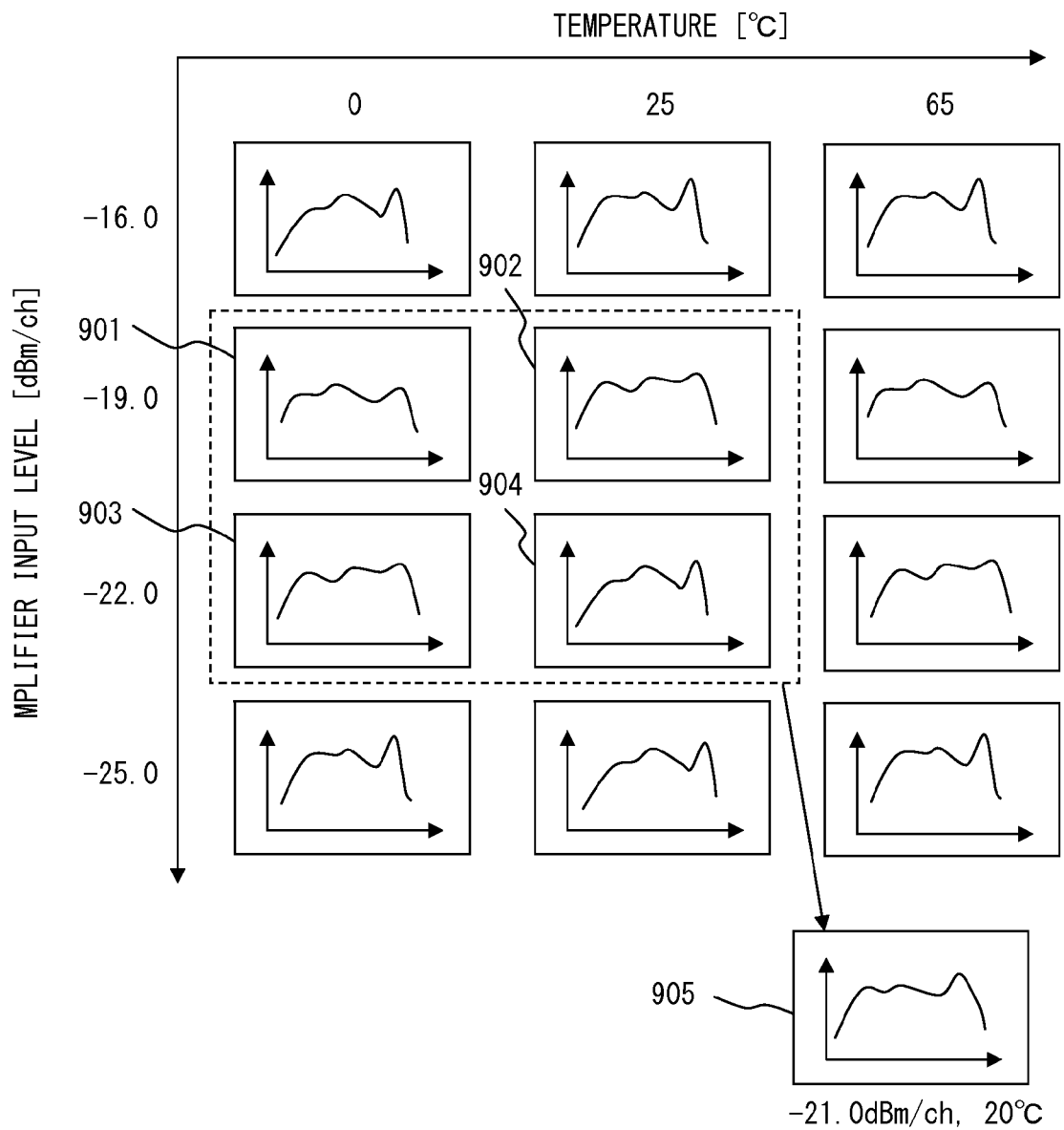
F I G. 9

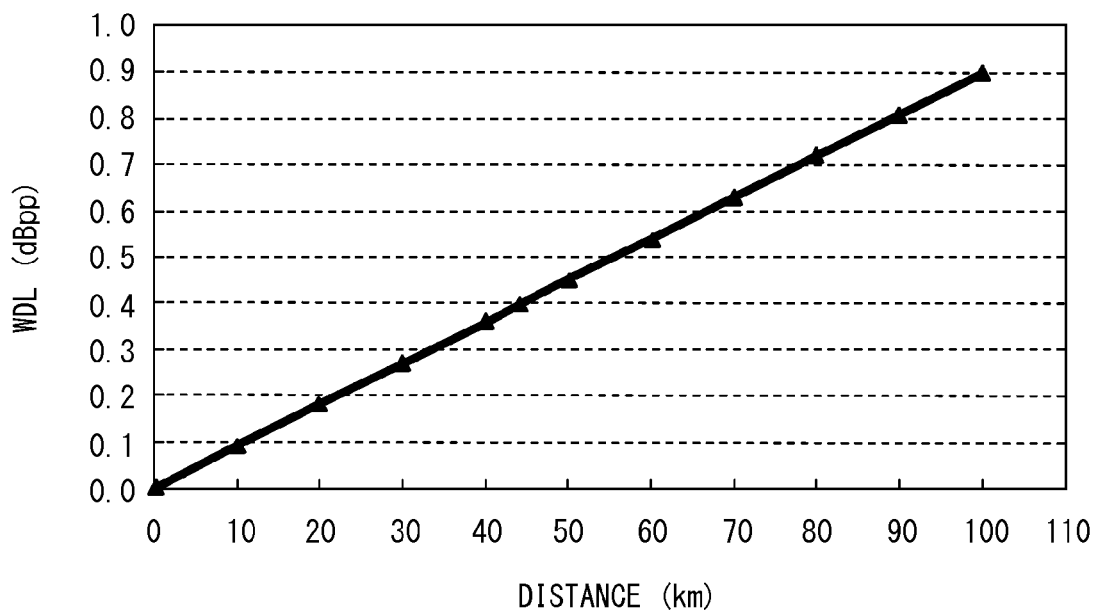
F I G. 1 2

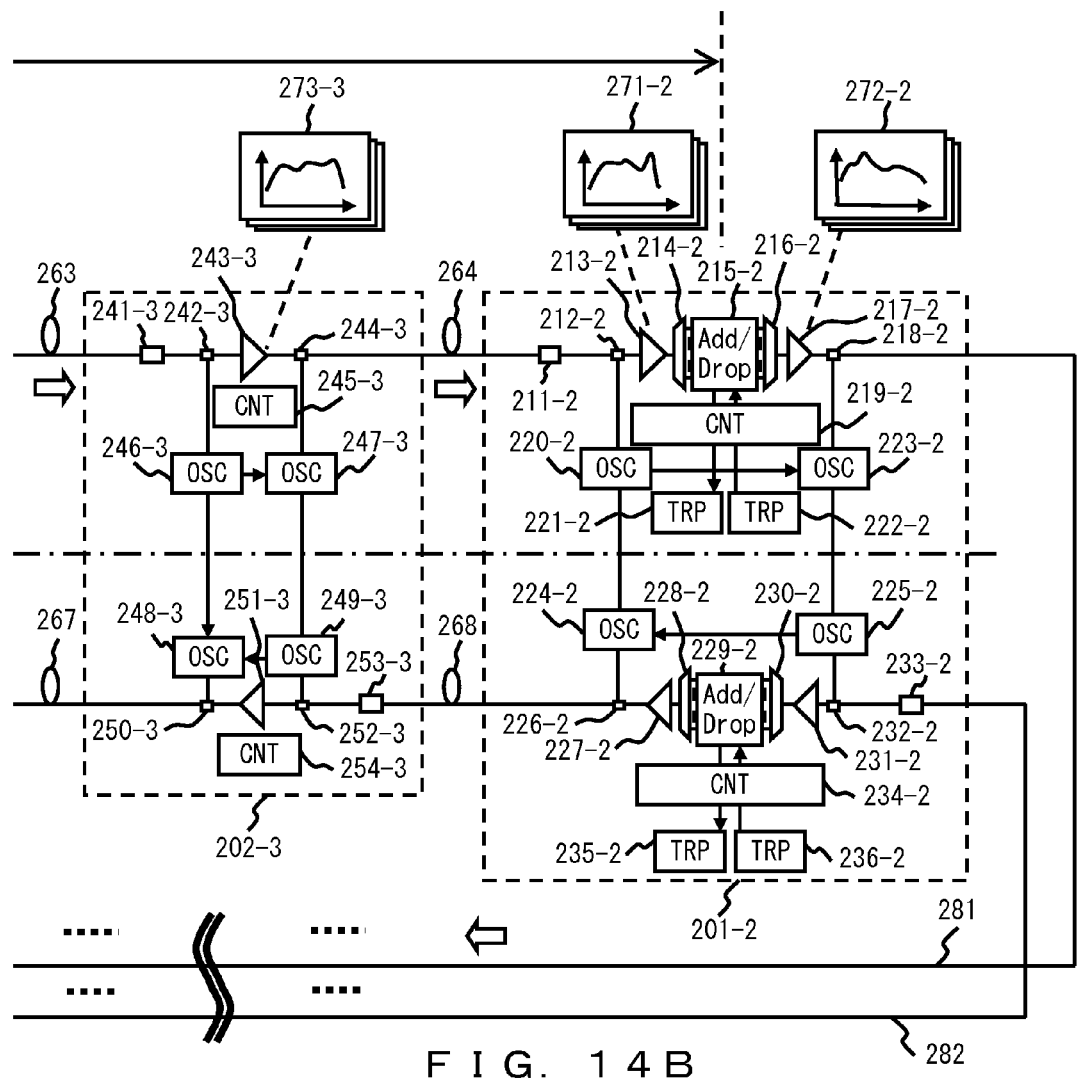
F I G. 14B

OPTICAL TRANSMISSION DEVICE

CROSS-REFERENCE TO RELATED APPLICATIONS

This application is a continuation application of International PCT Application No. PCT/JP2007/000262 which was filed on Mar. 19, 2007.

FIELD

The embodiments discussed herein are related to an optical transmission device that compensates for gain wavelength characteristics of optical amplifiers in a wavelength-division multiplexing (WDM) communications system, and to a method of compensating for gain wavelength characteristics.

BACKGROUND

Generally, in a wavelength-division multiplexing communications system, each station (node) uses an optical add-drop multiplexer (OADM) having a function of adding and dropping each wavelength and a function of controlling gain wavelength characteristics, or uses an in-line amplifier (ILA) serving as an optical amplifier for relaying data between OADMs.

FIG. 1 illustrates an exemplary configuration of a conventional add-drop transmission device. This add-drop transmission device includes optical couplers 51, 54, and 61, a preamplifier 52, an optical demultiplexer 53, an optical switch 55, a variable optical attenuator (VOA) 56, a beam splitter 57, a photodetector 58, an optical multiplexer 59, a post amplifier 60, optical supervisory channel (OSC) transceivers 62 and 65, and transponders 63 and 64. The optical coupler 54, the optical switch 55, the VOA 56, the beam splitter 57, and the photodetector 58 are provided for each wavelength.

The optical signal of each wavelength is branched by the optical coupler 54, and is converted into an electric signal by the transponder 63. Also, an electric signal to be transmitted is converted into an optical signal of a corresponding wavelength by the transponders 64, and is added to the optical path by the optical switch 55.

As a method of compensating for variations in the optical power between wavelengths in an add-drop transmission device such as that described above, an optical signal level controlling method is suggested in which the VOA 56 in the device automatically controls such variations (see Patent Document 1 for example). In this method, the photodetector 58 detects the power level of each wavelength, and the amount attenuated by the VOA 56 is adjusted so that the power level is made to be uniform.

FIG. 2 illustrates an exemplary configuration of a conventional relaying device. This relaying device includes optical couplers 71 and 73, an in-line amplifier 72, and OSC transceivers 74 and 75.

Patent Document 1: Japanese Laid-open Patent Publication No. 2004-007058

SUMMARY

According to the first aspect of the embodiment, an optical transmission device is used in a wavelength-division multiplexing communications system including a plurality of optical transmission devices having an optical amplifier, and includes a receiver and a controller. The receiver receives, from a plurality of downstream optical transmission devices and through an opposite transmission line, gain wavelength characteristic information of an optical amplifier in each of the downstream optical transmission devices. The controller controls gain wavelength characteristics of the optical transmission device on the basis of the received gain wavelength characteristic information.

According to the second aspect of the embodiment, an optical transmission device is used in a wavelength-division multiplexing communications system of a ring configuration including a plurality of optical transmission devices having an optical amplifier, and includes a receiver and a controller. The receiver receives, from a plurality of downstream optical transmission devices and through an upstream transmission line, gain wavelength characteristic information of an optical amplifier in each of the downstream optical transmission devices. The controller controls gain wavelength characteristics of the optical transmission device on the basis of the received gain wavelength characteristic information.

According to the third aspect of the embodiment, an optical transmission device includes an optical amplifier, a storing unit, and a transmission unit, amplifies a wavelength-multiplexed light received from a first upstream optical transmission device and transmits an amplified light to a downstream optical transmission device. The optical amplifier amplifies the wavelength-multiplexed light. The storing unit stores gain wavelength characteristic information of the optical amplifier. The transmission unit transmits the gain wavelength characteristic information to a second upstream optical transmission device through an opposite transmission path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a configuration of a conventional add-drop transmission device;

FIG. 2 illustrates a configuration of a conventional relay device;

FIG. 4 illustrates a synthesized gain profile;

FIG. 5 is a flowchart of a first gain deviation compensation process;

FIG. 7 illustrates a configuration of an add-drop transmission device using a WSS;

FIG. 8 is a flowchart of a second gain deviation compensation process;

FIG. 9 illustrates gain profiles obtained under different use conditions;

FIG. 12 illustrates a dependency of WDL on distance;

FIGS. 14A and 14B illustrate a configuration of a second wavelength-division multiplexing communications system.

DESCRIPTION OF EMBODIMENTS

Figure 3A:
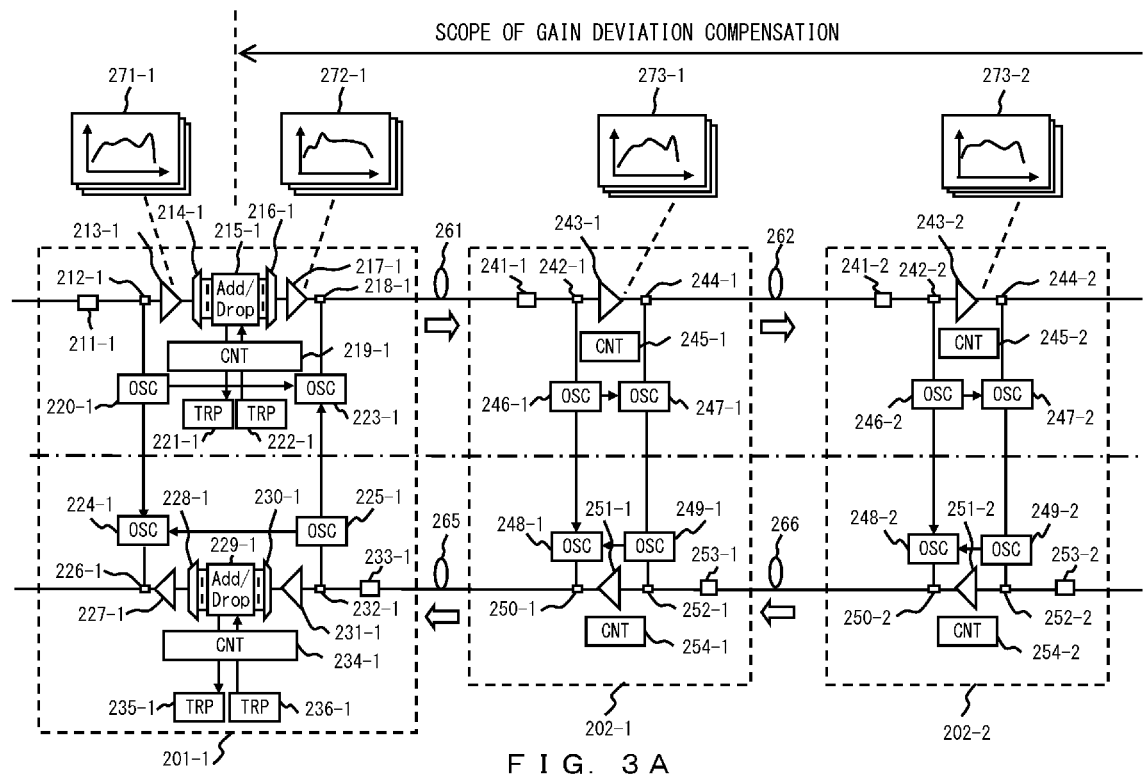
FIGS. 3A and 3B illustrate a configuration of a first wavelength-division multiplexing communications system.

As described previously, variations in the optical power between wavelengths in an add-drop transmission device are compensated for by an optical signal level controlling method. However, a conventional wavelength-division multiplexing communications system has problems as described below.

Generally, it is preferable to minimize cost in designing of a network for a wavelength-division multiplexing communications system. In order to reduce cost, it is desired that ILAs be used for nodes where there is no add-drop requests with OADMs being used only for nodes where there are add-drop requests.

However, relay devices do not compensate for gain deviation due to the gain wavelength characteristics of optical amplifiers, and accordingly gain deviation of optical amplifiers is accumulated when a large number of relay devices are cascaded on a network. This prevents downstream add-drop transmission devices from compensating for the gain deviation sufficiently, and this results in an unsuccessful level diagram design for the device. Accordingly, it is preferable to limit the number of cascaded relay devices that can be designed into the device.

As described above, the reduction of accumulation of gain deviation caused by a cascading connection of relay devices and increasing the number of connectable relay devices are important factors in reducing costs in the designing of networks.

A method in which an add-drop transmission device on the transmission side compensates beforehand for variations in optical power levels that are expected to occur in downstream stages can be used for reducing the accumulation of the gain deviation caused by relay devices. For example, there is a method in which measurement data that a receiving station (an add-drop transmission device on the receiving side) has obtained using a spectrum analyzer unit (SAU) is fed back to the transmission side via an OSC in order to make uniform the optical signal to noise ratios (OSNRs) in the receiving station. However, this method requires the provision of expensive SAUs to all add-drop transmission devices.

Preferred embodiments of the present invention will be explained with reference to accompanying drawings.

The optical transmission device in the first aspect of the embodiment corresponds, for example, to an add-drop transmission device 201-1 illustrated in FIG. 3A that will be explained later. The optical transmission device in the second aspect of the embodiment corresponds, for example, to the add-drop transmission device 201-1 illustrated in FIG. 14A that will be explained later. The receiver corresponds, for example, to an OSC transceiver 225-1 or 220-1. The controller corresponds, for example, to an add-drop unit 215-1 or a WSS 704 illustrated in FIG. 7 that will be explained later.

According to the optical transmission device in the first or second aspect of the embodiment, gain wavelength characteristics in the downstream optical transmission devices can be compensated for collectively. This can reduce the accumulation of gain deviation caused by a cascading connection of relay devices and allows for an increase in the number of relay devices, and thereby the designing of networks can be implemented at a low cost. Also, it is made possible for an inexpensive configuration to compensate for gain deviation.

The optical transmission device in the third aspect of the embodiment corresponds, for example, to one of relay devices 202-1 through 202-3 or to an add-drop transmission device 201-2 illustrated in FIG. 3A, 3B, 14A or FIG. 14B that will be explained later. The optical amplifier corresponds, for example, to one of in-line amplifiers 243-1 through 243-3 or to a preamplifier 213-2. The storing unit corresponds, for example, to one of control units 245-1 through 245-3 and 219-2. The transmission unit corresponds, for example, to one of OSC transceivers 248-1 through 248-3, 224-2, 247-1 through 247-3 and 223-2.

According to the optical transmission device in the third aspect of the embodiment corresponds, downstream optical transmission devices can transmit to an upstream optical transmission device the gain wavelength characteristics of respective optical amplifiers, and the upstream optical transmission device can compensate for those gain wavelength characteristics collectively. This can cause a similar effect to that caused by the optical transmission device in the first or second aspect of the embodiment.

In the first wavelength-division multiplexing (WDM) communications system, in order to reduce the accumulation of gain deviation caused by relay devices when optical signals are relayed through cascaded relay devices, information on the gain wavelength characteristics of the optical amplifier in each relay device is transmitted to the upstream side via the OSC of the opposite transmission line, and an upstream add-drop transmission device controls the gain wavelength characteristics on the basis of this information.

Figure 3B:
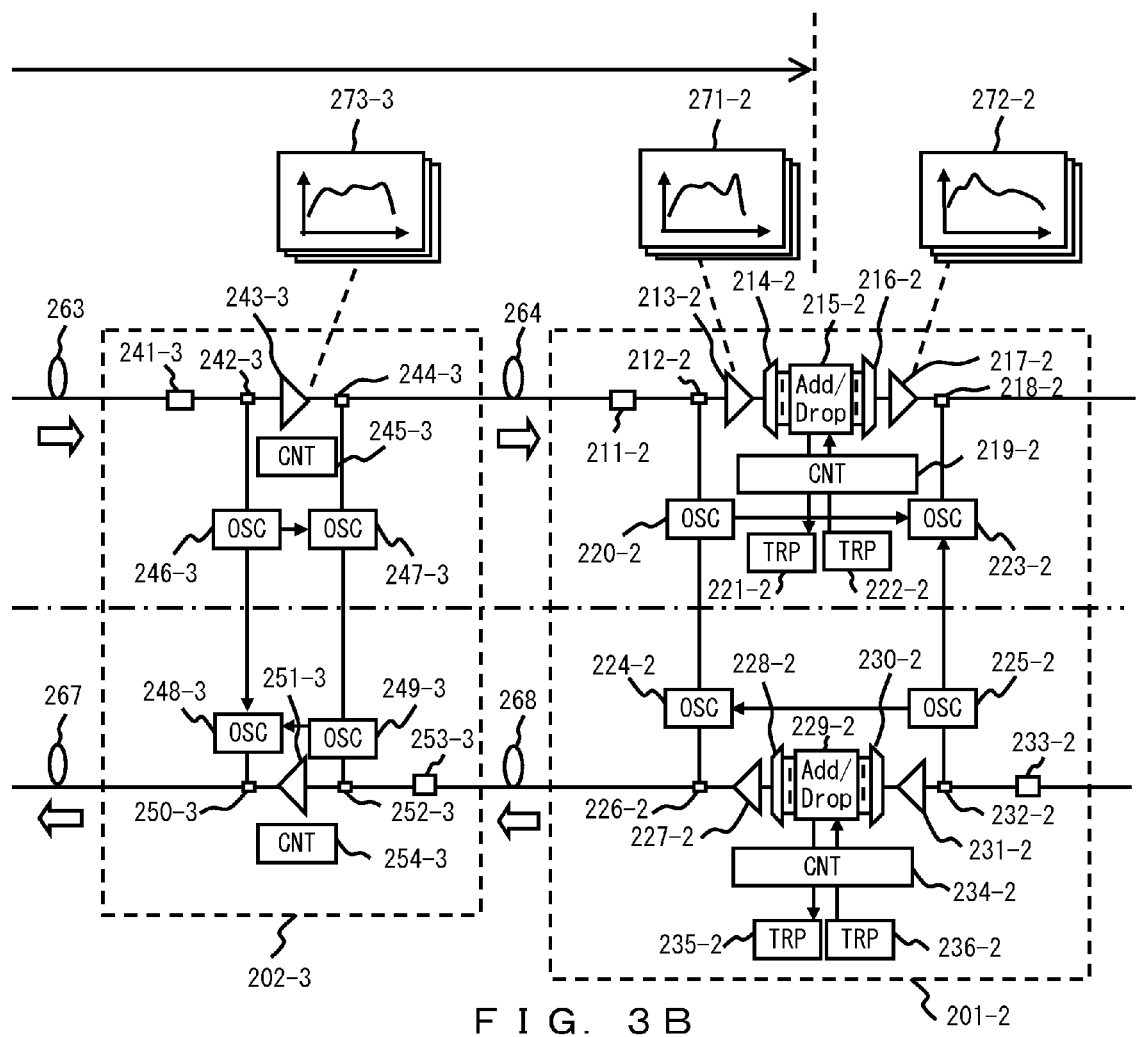

FIGS. 3A and 3B illustrate an exemplary configuration of the first wavelength-division multiplexing communications system such as the one described above. This wavelength-division multiplexing communications system includes add-drop transmission devices 201-1 and 201-2, and relay devices 202-1 through 202-3.

Add-drop transmission device 201-1 and relay device 202-1 are connected to each other via transmission lines 261 and 265. Relay devices 202-1 and 202-2 are connected to each other via transmission lines 262 and 266. Relay device 202-2 and relay device 202-3 are connected to each other via transmission lines 263 and 267. Relay device 202-3 and add-drop transmission device 201-2 are connected to each other via transmission lines 264 and 268. Among them, transmission lines 261 through 264 are used for the forward transmission, and transmission lines 265 through 268 are used for the inverse transmission.

The add-drop transmission device 201-$i$ ($i$=1, 2) includes optical attenuators 211-$i$ and 233-$i$, optical couplers 212-$i$, 218-$i$, 226-$i$, and 232-$i$, preamplifiers 213-$i$ and 231-$i$, post amplifiers 217-$i$ and 227-$i$, optical demultiplexers 214-$i$ and 230-$i$, add-drop units 215-$i$ and 229-$i$, optical multiplexers 216-$i$ and 228-$i$, control units 219-$i$ and 234-$i$, OSC transceivers 220-$i$, 223-$i$, 224-$i$, and 225-$i$, and transponders 221-$i$, 222-$i$, 235-$i$, and 236-$i$.

Among them, add-drop units 215-$i$ and 229-$i$ are each provided with an optical coupler, an optical switch, a VOA, a beam splitter, and a photodetector for each wavelength similarly to the add-drop transmission device illustrated in FIG. 1. As optical demultiplexers 214-$i$ and 230-$i$ and optical multiplexers 216-$i$ and 228-$i$, an array waveguide grating (AWG) for example is used.

A relay device 202-$j$ ($j$=1, 2, and 3) has optical attenuators 241-$j$ and 253-$j$, optical couplers 242-$j$, 244-$j$, 250-$j$, and 252-$j$, in-line amplifiers 243-$j$ and 251-$j$, control units 245-$j$ and 254-$j$, and OSC transceivers 246-$j$, 247-$j$, 248-$j$, and 249-$j$.

The gain wavelength characteristics of an optical amplifier are tested for each amplifier module, and the obtained measurement data is stored as gain profiles in a database in the control unit in each of the relay devices.

For example, gain profiles 271-$i$, 272-$i$, and 273-$j$ are obtained respectively for the preamplifier 213-$i$, the post amplifier 217-$i$, and the in-line amplifier 243-$j$, and the gain profiles 271-$i$ and 272-$i$ are held by the control unit 219-$i$, and the gain profile 273-$j$ is held by the control unit 245-$j$.

Among them, the gain profile 271-2 for the downstream add-drop transmission device 201-2 is output from the control unit 219-2 via the OSC transceivers 220-2 and 224-2 to the opposite transmission line. Then, it is transferred to the upstream add-drop transmission device 201-1 via the transmission lines 265 through 268 to reach the control unit 219-1 via the OSC transceivers 225-1 and 223-1.

The gain profile 273-$j$ for the relay device 202-$j$ is output from the control unit 245-$j$ via the OSC transceivers 246-$j$ and 248-$j$ to the opposite transmission line. Then, it is transferred to the add-drop transmission device 201-1 through the transmission lines 265 through 267 to reach the control unit 219-1 via the OSC transceivers 225-1 and 223-1.

The control unit 219-1 controls the gain wavelength characteristics on the basis of the received gain profiles in order to compensate beforehand for the gain deviation that is expected to occur in downstream optical amplifiers. In such a case, the add-drop transmission device 201-1 performs the compensation for the gain deviation in the post amplifier 217-1, the in-line amplifiers 243-1 through 243-3, and the preamplifier 213-2.

Thus, the control unit 219-1 synthesizes the gain profiles 272-1, 273-1 through 273-3 and 271-2 of these optical amplifiers in order to generate a synthesized gain profile as illustrated in FIG. 4. Then, the control unit 219-1 controls the VOAs in the add-drop unit 215-1 in order to perform gain deviation compensation that can cancel the synthesized gain profile.

This gain deviation compensation mainly aims at the compensation for the two following points. One is gain deviation occurring in optical amplifiers or transmission lines between add-drop transmission devices. The other is the production variation in the losses or wavelength deviation caused by optical couplers, VOAs, AWGs, or the like used in add-drop transmission devices.

The former can be compensated for by performing compensation beforehand by using the above described method, although deviation occurring on transmission lines is not compensated for. The latter requires feedback control based on the measurement of the power level of each wavelength in an add-drop transmission device.

This example uses, in combination, the above two methods, i.e., compensation of gain deviation of optical amplifiers performed beforehand and compensation of wavelength deviation in an add-drop transmission device based on the power level measurement for each wavelength. Specifically, for the former, a total of the gain wavelength characteristics of optical amplifiers is obtained as illustrated in FIG. 4 in order to perform inverse compensation to cancel the total gain wavelength characteristics. For the latter, the power level of each wavelength is monitored by a photodetector in a stage later than a VOA in order to adjust the VOA so that the monitored power levels become uniform. Accordingly, the amount attenuated by a VOA is adjusted to a value obtained by adding two attenuation amounts for the two methods.

The post amplifier 271-1 and the downstream in-line amplifiers 243-1 through 243-3 in stages later than the VOA operate in accordance with the input levels. Accordingly, each VOA is controlled so that an average of power levels of wavelengths output from VOAs is uniform in order to prevent the control of the relay device 202-1 from influencing the operations of relay devices 202-1 through 202-3.

FIG. 5 is a flowchart of a gain deviation compensation process such as the one described above. First, the control unit in each of the transmission devices within the scope of the gain deviation compensation of the relay device 202-1 transmits the gain profile of the optical amplifier to the relay device 202-1 (step 501). In such a case, the gain profiles 271-2 and 273-1 through 273-3 are transmitted respectively from the add-drop transmission device 201-2 and the relay devices 202-1 through 202-3.

Next, the control unit 219-1 of the relay device 202-1 obtains the total value $G1(\lambda)$ of the gain deviation of the optical amplifiers within the scope of the gain deviation compensation on the basis of the received gain profiles and the gain profile 272-1 of the post amplifier 217-1 of the control unit 219-1 itself (step 502). $G1(\lambda)$ here represents the distribution of the total value (the unit is dB) of the gain with respect to the wavelength $\lambda$ in the wavelength scope of the gain profiles.

Next, the control unit 219-1 obtains the average value G1ave over wavelengths of $G1(\lambda)$, and obtains, by the numerical expression below, gain deviation compensation value $G2(\lambda)$ in order to cancel $G1(\lambda)$ (step 503).

$$G2(\lambda)=G1\text{ave}-G1(\lambda)[dB] \qquad (1)$$

Next, the control unit 219-1 obtains a monitored value from the photodetector of each wavelength in the add-drop unit 215-1 (step 504), and obtains attenuation amount $V1(\lambda)$ so that the VOA output of each wavelength is $L1+L2(\lambda)$ (step 505). Note that L1 represents an output target value of the VOA that does not depend on the wavelength, and L2 represents a value obtained by converting $G2(\lambda)$ into a VOA output.

Next, the control unit 219-1 sets $V1(\lambda)$ as the attenuation amount of the VOA for each wavelength (step 506), and the processes in and after step 504 are repeated.

This gain deviation compensation process can reduce the accumulation of gain deviation caused by cascaded relay devices, and thereby a greater number of relay devices can be used to realize the designing of lower-cost networks. Also, gain deviation can be compensated for by a lower-cost configuration.

Further, the method in which gain deviation is compensated for in an upstream add-drop transmission device can cause better OSNR in comparison to the case in which a downstream add-drop transmission device compensates for the same gain deviation.

An amplifier is usually provided with plural gain blocks in order to compensate for not only losses in transmission lines but also for losses caused by dispersion compensation modules (DCM), and this causes a greater amount of noise than post amplifiers. Accordingly, the preamplifier side is worse than the post amplifier side in OSNR.

Taking this into consideration, gain deviation is compensated for on the post amplifier side, yielding better OSNR than when it is compensated for in the preamplifier side, which yields worse OSNR, which results in less deterioration of the total received OSNR on an optical path (total value of the OSNRs of post amplifiers and preamplifiers on optical paths). This effect will be explained by using the numerical expression below.

Figure 6:
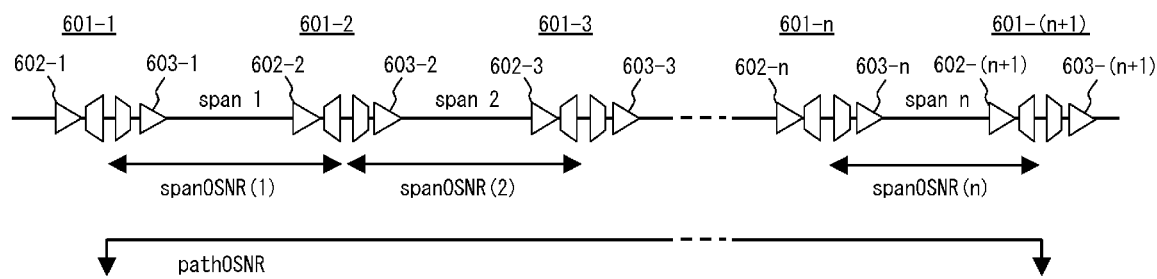
FIG. 6 illustrates an OSNR per span and total received OSNR on an optical path.

As illustrated in FIG. 6, it is assumed that the number of the spans included in an optical path is n, the i-th span is span i (i=1, 2, . . . , n), the OSNR of span i is spanOSNR(i), and the total received OSNR in the optical path is pathOSNR. On the basis of this assumption, pathOSNR is obtained from spanOSNR(1) through spanOSNR(n).

The difference between the compensation point in the preamplifier side and the post amplifier side influences OSNR only in add-drop transmission devices, and accordingly a configuration that includes n+1 add-drop transmission devices and that does not include relay devices is considered in FIG. 6. An add-drop transmission device 601-$i$ ($i$=1, 2, ..., n+1) includes a preamplifier 602-$i$ and a post amplifier 603-$i$.

When the OSNR on the post amplifier side that is upstream from a span is OSNRpost and the OSNR on the preamplifier side that is downstream from the span is OSNRpre, the inverse number of spanOSNR can be obtained as the sum of the inverse numbers of OSNRpost and OSNRpre. The numerical expression below can be used for calculating spanOSNR when all the values are expressed in antilogarithm.

$$spanOSNR = \left(\frac{1}{OSNRpost} + \frac{1}{OSNRpre}\right)^{-1} \quad (2.1)$$

Also, the numerical expression below can be used for calculating gain deviation Tilt to be compensated for when the average value and the minimum value of the gain in the gain profile are Gave and Gmin, respectively.

$$Tilt = Gave/Gmin > 1 \quad (2.2)$$

The OSNR of the worst channel is expressed by using the above Tilt, i.e., OSNR/Tilt. Further, spanOSNR when gain deviation is compensated for on the post amplifier side and on the preamplifier side can be obtained in the following ways, respectively.

A: when gain deviation is compensated for on post amplifier side $$spanOSNR_A = \left(\frac{1}{OSNRpost/Tilt} + \frac{1}{OSNRpre}\right)^{-1} \quad (2.3)$$
$$= \frac{OSNRpost \times OSNRpre}{OSNRpre \times Tilt + OSNRpost}$$

B: when gain deviation is compensated for on preamplifier side $$spanOSNR_B = \left(\frac{1}{OSNRpost} + \frac{1}{OSNRpre/Tilt}\right)^{-1} \quad (2.4)$$
$$= \frac{OSNRpost \times OSNRpre}{OSNRpre + OSNRpost \times Tilt}$$

Also, because the OSNR on the preamplifier side is worse than that in the post amplifier side, as was already mentioned, the following numerical expression is satisfied.

$$OSNRpost > OSNRpre \quad (2.5)$$

Further, the following numerical expression is also satisfied on the basis of numerical expressions (2.2) through (2.5)

$$spanOSNR_A > spanOSNR_B \quad (2.6)$$

This indicates that the compensation in an upstream add-drop transmission device (on the post amplifier side) results in a better OSNR per span than the compensation in a downstream add-drop transmission device (on the preamplifier side).

The total received OSNR on the optical path can be obtained by the following numerical expression by using spanOSNR($i$).

$$pathOSNR = \left(\sum_{i=1}^{n} \frac{1}{spanOSNR(i)}\right)^{-1} \quad (2.7)$$

Similarly, pathOSNR when gain deviation is compensated for on the post amplifier side and on the preamplifier side can be obtained in the following ways, respectively.

A: when gain deviation is compensated for on post amplifier side $$pathOSNR_A = \left(\sum_{i=1}^{n} \frac{1}{spanOSNR_A(i)}\right)^{-1} \quad (2.8)$$

B: when gain deviation is compensated for on preamplifier side $$pathOSNR_B = \left(\sum_{i=1}^{n} \frac{1}{spanOSNR_B(i)}\right)^{-1} \quad (2.9)$$

Numerical expression (2.6) is satisfied for all spans, and therefore the following numerical expression is satisfied for the $i$-th span.

$$\frac{1}{spanOSNR_A(i)} < \frac{1}{spanOSNR_B(i)} \quad (2.10)$$

Therefore, the following numerical expression is also satisfied.

$$\sum_{i=1}^{n} \frac{1}{spanOSNR_A(i)} < \sum_{i=1}^{n} \frac{1}{spanOSNR_B(i)} \quad (2.11)$$

The following numerical expression is also satisfied because of numerical expressions (2.8), (2.9) and (2.11).

$$pathOSNR_A > pathOSNR_B \quad (2.12)$$

This indicates that the compensation in the upstream add-drop transmission device (on the post amplifier side) results in better total received OSNR on the optical path than the compensation in the downstream add-drop transmission device (on the preamplifier side).

In the wavelength-division multiplexing communications system illustrated in FIGS. 3A and 3B, the VOA in the add-drop unit 215-1 compensates for gain deviation; however, a wavelength selectable switch (WSS) may be used in place of the VOA.

A WSS is a device that inputs and outputs WDM signals and can perform the wavelength separation and the optical path switching for an arbitrary channel that are realized by the combination of the optical demultiplexer 53 and the optical switch 55 in the configuration in FIG. 1. Also, a WSS can perform loss addition to an arbitrary wavelength that is realized by the optical demultiplexer 53 and the VOA 56 in the configuration in FIG. 1, and accordingly can be used for gain deviation compensation.

FIG. 7 illustrates an exemplary configuration of an add-drop transmission device that uses a WSS such as the one described above. This add-drop transmission device includes optical couplers 701, 703, and 706, a preamplifier 702, a WSS 704, a post amplifier 705, an optical demultiplexer 707, an optical multiplexer 708, OSC transceivers 709 and 712, and transponders 710 and 711.

A WDM signal is branched by the optical coupler 703, is demultiplexed into optical signals of respective wavelengths by the optical demultiplexer 707, and an optical signal of a wavelength is input into the transponder 710. An optical signal output from the transponder 711 is multiplexed by the optical multiplexer 708, and is inserted into an optical path by the WSS 704.

When the add-drop transmission device illustrated in FIG. 7 is used instead of the add-drop transmission device illustrated in FIG. 1, the loss amount is adjusted by the WSS instead of the adjustment of the attenuation amount of the VOA performed in steps 504 through 506 in FIG. 5. In such a case, the loss amount for each wavelength can be adjusted by changing the angle of the micro-electro-mechanical systems (MEMS) mirror in the WSS.

It is also possible for the post amplifier module in the add-drop transmission device to give a primary slope to the gain wavelength characteristics in order to use it for the compensation for the gain deviation. Usually, outputs from an amplifier module involve gain deviation that remains unremoved by a fixed gain equalizer; however, such outputs are controlled to have flat wavelength characteristics, that is, wavelength characteristics having no slope on the whole. From this state, the gain of the optical amplifier is changed intentionally so as to have the primary slope in order to use it for the compensation for the gain deviation. However, only the components of the primary slope of the gain deviation can be compensated for, and residual components, i.e., components that have not been compensated for are to be compensated for by the add-drop transmission device on the receiving side.

FIG. 8 is a flowchart of a gain deviation compensation process such as the one described above. The operations in steps 801 through 803 are similar to those in steps 501 through 503 in FIG. 5. The control unit 219-1 in the relay device 202-1 obtains $G2(\lambda)$, and thereafter obtains the primary slope $G2s$ of the gain deviation from $G2(\lambda)$ (step 804). $G2s$ corresponds to the slope in a straight-line approximation of $G2(\lambda)$, and is obtained by the least squares method or the like.

Next, the control unit 219-1 obtains the monitored value from the photodetector of each wavelength (step 805), and obtains attenuation amount $V1(\lambda)$ of the VOA so that the VOA output of each wavelength is L1 (step 806). Thereafter, the control unit 219-1 sets $V1(\lambda)$ as the attenuation amount of the VOA for each wavelength (step 807), and the processes in and after step 806 are repeated.

Further, it is also possible to use as gain profiles several pieces of data at different temperature and amplifier input levels. In such a case, an amplifier module is tested while changing temperature and amplifier input levels in order to obtain gain profiles under several different conditions, and the obtained profiles are stored in the database of the control unit.

For the actual operation, values of a gain profile are interpolated among the gain profiles in accordance with a use condition (temperature and an amplifier input level) as illustrated in FIG. 9, and the obtained gain profile is transmitted to the upstream transmission device. In the example in FIG. 9, a gain profile 905 for the use condition is generated from four gain profiles 901 through 904 under different conditions.

Temperature is acquired by the temperature monitor in the amplifier module, and amplifier input levels are acquired by the photodetector in the amplifier module. For the interpolation among gain profiles, linear interpolation, etc. may be adopted. This method enables gain deviation compensation while taking into consideration conditions such as temperature and amplifier input levels.

Figure 10:
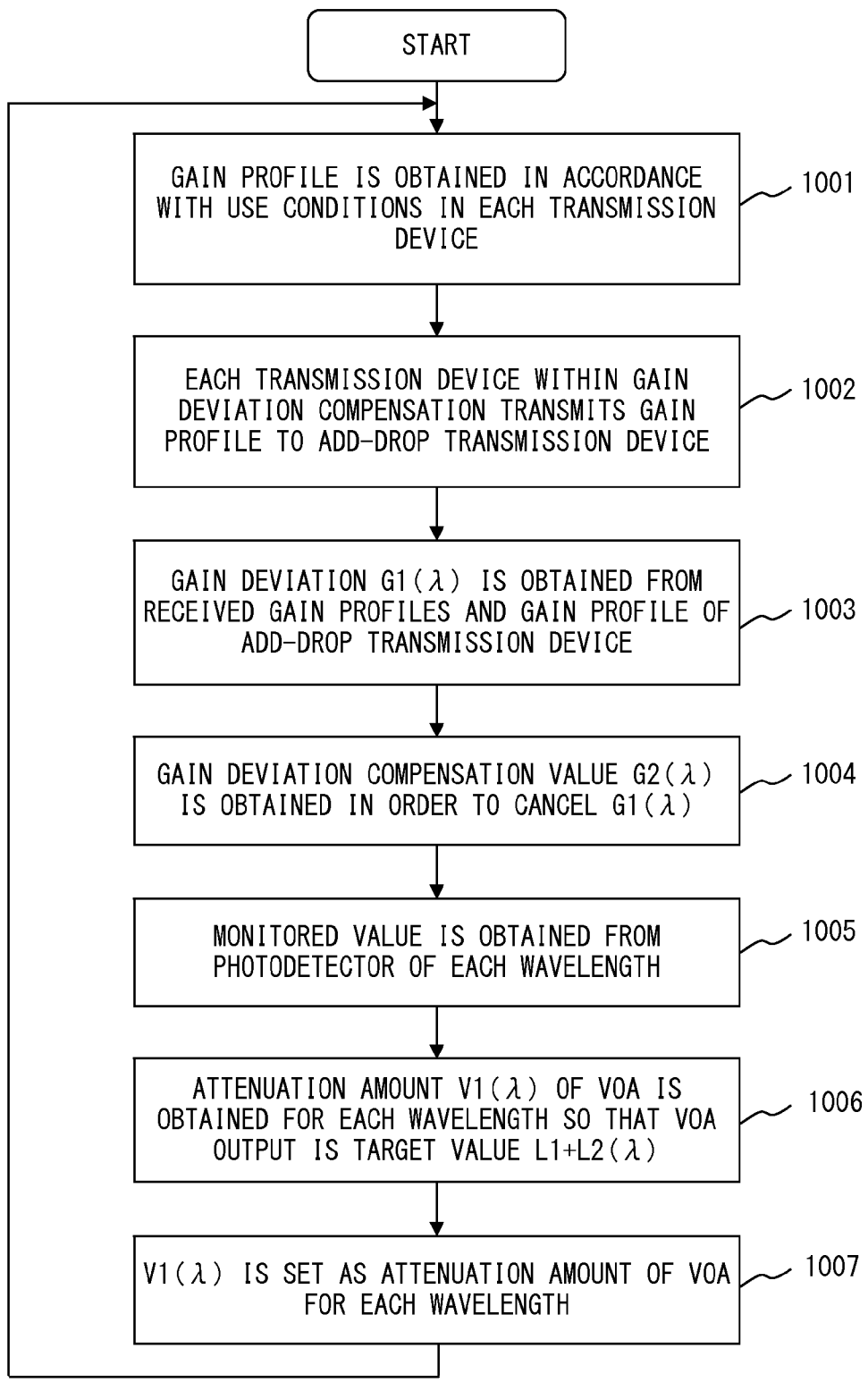
FIG. 10 is a flowchart of a third gain deviation compensation process.

FIG. 10 is a flowchart of a gain deviation compensation process such as the one described above. First, the control unit in each transmission device obtains the current temperature and amplifier input level, and interpolates values among the gain profiles according to the obtained conditions in order to obtain the current gain profile (step 1001). Next, the wavelength-division multiplexing communications system performs similar operations to those in steps 501 through 506 in FIG. 5 (step 1002 through 1007). When $V1(\lambda)$ is set as the attenuation amount of the VOA, the wavelength-division multiplexing communications system repeats the operations in and after step 1001.

A gain deviation compensation process such as the one described above can implement the designing of networks at a low cost as described above, and also can cause the following effects.

Gain wavelength characteristics in an optical amplifier change according to the temperature, and a heater or the like is often used to make temperature constant in the amplifier module so that the optical amplifier operates stably. However, the use of the gain deviation compensation process illustrated in FIG. 10 can make the upstream transmission device compensate for the variation in the gain deviation caused by temperature variation, and accordingly each relay device may use an amplifier module that does not have a function of adjusting temperature. Thereby, the cost of amplifier modules of relay devices can be reduced.

By using the gain deviation compensation processes illustrated in FIGS. 5, 8, and 10, the upstream transmission device can compensate for gain deviation caused by the optical amplifier; however, it does not compensate for the stimulated Raman scattering (SRS) or wavelength dependent loss (WDL) occurring in the transmission line, which are the other causes of variations between the levels of other wavelengths.

Figure 11:
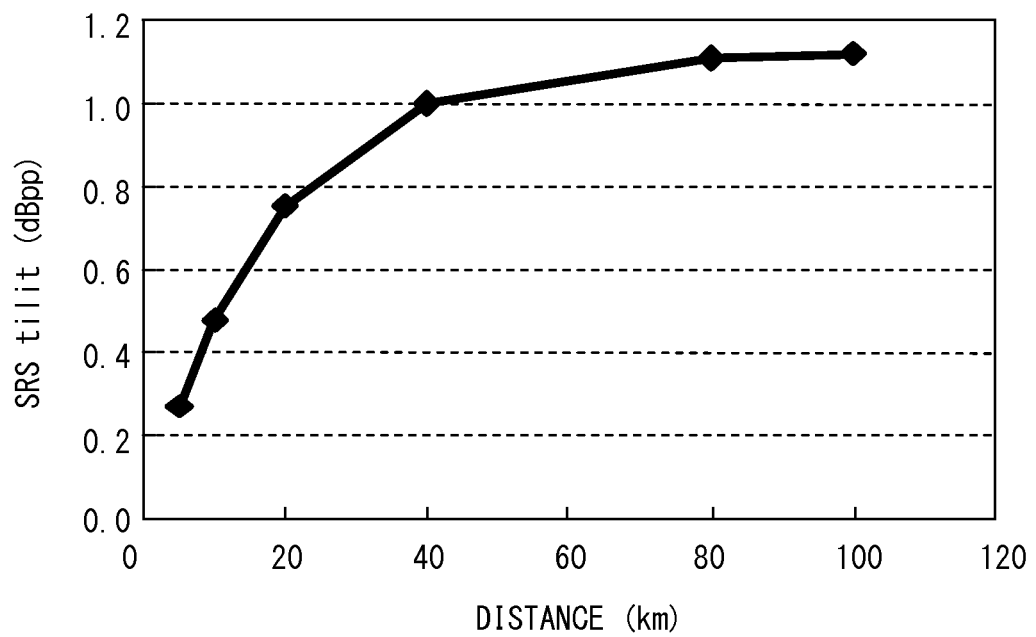
FIG. 11 illustrates a dependency of SRS on distance.

This drawback can be responded to by measuring the length of each transmission line beforehand in order to estimate the SRS and WDL occurring in transmission lines on the basis of the measured value so that those characteristics are compensated for together with the gain deviation of each optical amplifier. In such a case, for the sake of simplicity of calculation, the SRS and the WDL are both treated as the primary slope with respect to the wavelength so that a unique numerical value can be determined by the length of a transmission line by using the average transmission line characteristic according to the type of transmission line, as illustrated in FIGS. 11 and 12.

Figure 13:
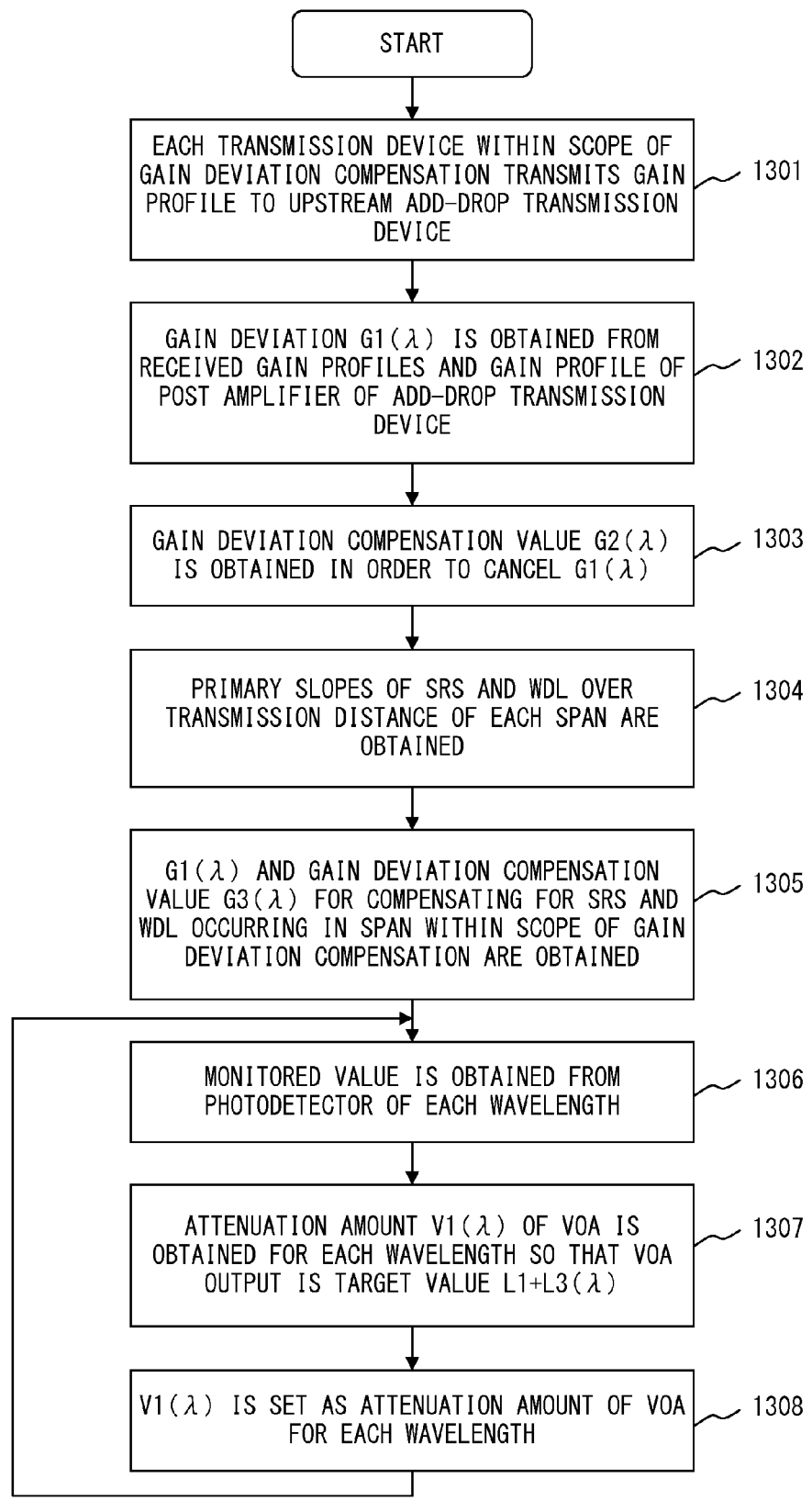
FIG. 13 is a flowchart of a fourth gain deviation compensation process.

FIG. 13 is a flowchart of a gain deviation compensation process such as that described above. The operations in steps 1301 through 1303 are similar to those in steps 501 through 503 in FIG. 5. The control unit 219-1 in the relay device 202-1 obtains $G2(\lambda)$, and thereafter obtains the primary slopes of the SRS and the WDL as SRS(i) and the WDL(i) corresponding to the distance of the i-th span within the scope of gain deviation compensation (step 1304).

In the example illustrated in FIG. 2, there are four spans of the transmission lines 261 through 264 within the scope of gain deviation compensation, and SRS(1) through SRS(4) and WDL(1) through WDL(4) are obtained for those spans.

Next, from the mathematical expression below, the control unit 219-1 obtains, in addition to $G1(\lambda)$, gain deviation compensation $G3(\lambda)$ to compensate for the SRS and WDL occurring in all the spans within the scope of gain deviation compensation (step 1305).

$$G3(\lambda) = \quad (3)$$

$$G2(\lambda) - \sum_{i=1}^{n} \{SRS(i) \times (\lambda - \lambda center) + WDL(i) \times (\lambda - \lambda center)\}$$

In the above numerical expression, λcenter represents the center wavelength. In the example illustrated in FIG. 2, n=4.

Next, the control unit 219-1 obtains the monitored value from the photodetector of each wavelength in the add-drop unit 215-1 (step 1306), and obtains attenuation amount V1(λ) of the VOA so that the VOA output of each wavelength is L1+L3(λ) (step 1307). L3(λ) represents the value obtained by converting G3(λ) into VOA output.

Next, the control unit 219-1 sets V1(λ) as the attenuation amount of the VOA for each wavelength (step 1308), and the processes in and after step 1306 are repeated.

In this gain deviation compensation process, SRS and WDL are both taken into consideration in order to obtain the gain deviation compensation value; however, it is also possible to take into consideration only one of them. Further, part or all of the gain deviation compensation processes in FIGS. 8, 10, and 13 may be implemented in an appropriate combination. In such a case, the add-drop transmission device illustrated in FIG. 7 may be used instead of the add-drop transmission device illustrated in FIG. 1.

Also, in the example illustrated in FIG. 2, each downstream transmission device transmits a gain profile to the upstream add-drop transmission device by using the OSC on the opposite transmission line; however, a network adopting a ring configuration may transmit gain profiles downstream by using the OSC in the forward direction. In such a case, gain profiles may be transferred to an upstream add-drop transmission device via a network of a ring configuration.

Figure 14A:
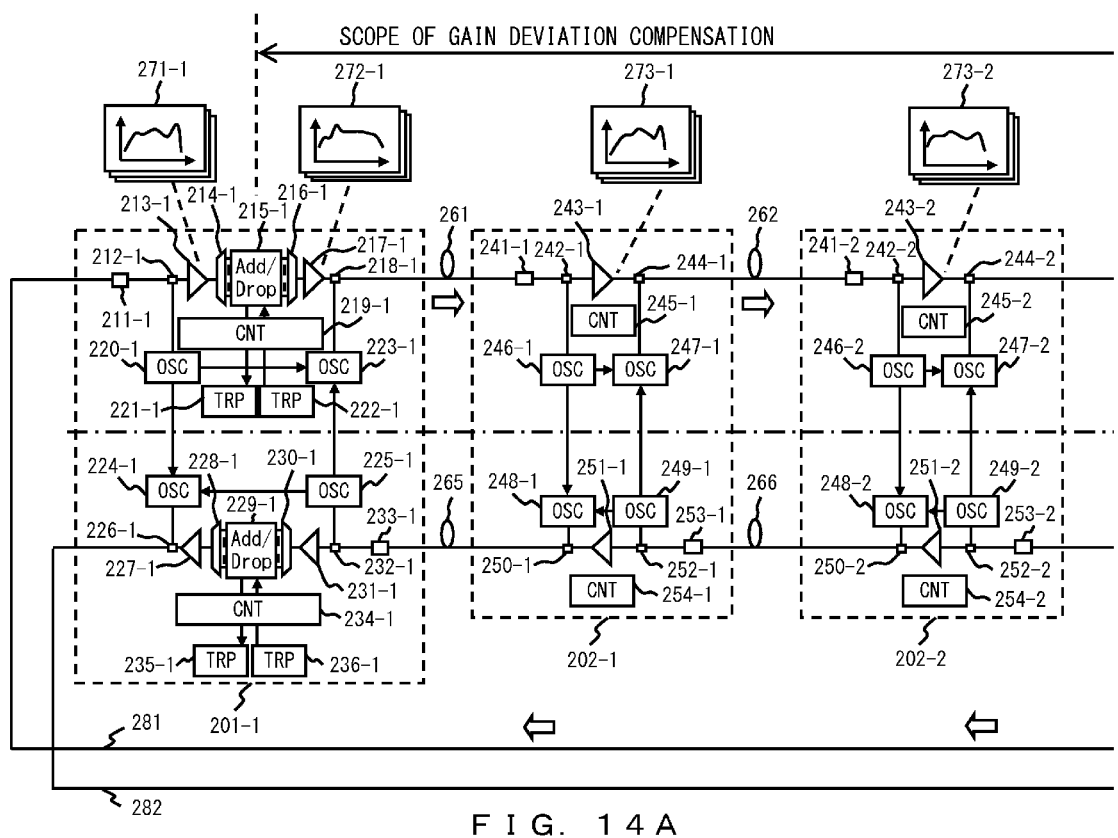

FIGS. 14A and 14B illustrate an exemplary configuration of a wavelength-division multiplexing communications system such as the one described above. This wavelength-division multiplexing communications system has essentially the same configuration as that illustrated in FIGS. 3A and 3B, and is different in that the add-drop transmission device 201-1 and the add-drop transmission device 201-2 are connected via transmission lines 281 and 282. The transmission lines 261 through 264 and 281 are used for the transmission in the forward direction (clockwise direction), and the transmission lines 265 through 268 and 282 are used for the transmission in the inverse direction (counterclockwise direction).

The gain profile 271-2 of the add-drop transmission device 201-2 is output from the control unit 219-2 to the optical path in the forward direction via the OSC transceiver 223-2. Then, it is transferred to the add-drop transmission device 201-1 via the transmission line 281, and is transferred to the control unit 219-1 via the OSC transceiver 220-1.

The gain profile 273-*j* of the relay device 202-*j* is output from the control unit 245-*j* to the optical line in the forward direction via the OSC transceiver 247-*j*. Then, it is transferred to the add-drop transmission device 201-1 through the transmission lines 262 through 264 and 281, and is transferred to the control unit 219-1 through the OSC transceiver 220-1.

The control unit 219-1 performs one of the above gain deviation compensation processes on the basis of the received gain profiles.

According to this transfer method, gain profiles can be transmitted from a downstream transmission device to an upstream transmission device even in a network that does not have an opposite transmission lines. Also, the transfer processes for the forward and inverse directions can be implemented independently, which can simplify the process.

Although the distribution of gain of an optical amplifier with respect to the wavelength is used as a gain profile in the above described embodiments, the distribution of the output power of an optical amplifier with a constant input level may be used instead of the distribution of gain.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device used in a wavelength-division multiplexing communications system including a plurality of optical transmission devices having an optical amplifier, the optical transmission device comprising:
   a receiver configured to receive, from a plurality of downstream optical transmission devices and through an opposite transmission line, gain wavelength characteristic information of an optical amplifier in each of the downstream optical transmission devices; and
   a controller configured to control gain wavelength characteristics of the optical transmission device on the basis of the received gain wavelength characteristic information, wherein:
   the controller makes the optical transmission device have a primary slope of the gain wavelength characteristics that cancels a total of gain wavelength characteristics of optical amplifiers in the downstream optical transmission devices.

2. The optical transmission device according to claim 1, wherein:
   the receiver receives the gain wavelength characteristic information of the optical amplifier from the downstream optical transmission devices placed between the receiver and a next optical transmission device having a function of controlling gain wavelength characteristics.

3. The optical transmission device according to claim 1, wherein:
   the controller controls the gain wavelength characteristics of the optical transmission device so that the total of the gain wavelength characteristics of the optical amplifiers in the downstream optical transmission devices and at least one of stimulated Raman scattering and wavelength dependent loss occurring on a downstream transmission line are cancelled collectively.

4. The optical transmission device according to claim 1, wherein:
   the receiver receives, through an optical supervisory channel, the gain wavelength characteristic information of the optical amplifier in each of the downstream optical transmission devices.

5. The optical transmission device according to claim 1, wherein:
   the controller includes an optical demultiplexer configured to demultiplex a wavelength-multiplexed light for each wavelength and a variable optical attenuator configured to adjust an attenuation amount of an optical signal of each wavelength.

6. The optical transmission device according to claim 1, wherein:
the controller includes a wavelength selectable switch configured to demultiplex a wavelength-multiplexed light for each wavelength and adjust loss in an optical signal of each wavelength.

7. An optical transmission device used in a wavelength-division multiplexing communications system of a ring configuration including a plurality of optical transmission devices having an optical amplifier, the optical transmission device comprising:
a receiver configured to receive, from a plurality of downstream optical transmission devices and through an upstream transmission line, gain wavelength characteristic information of an optical amplifier in each of the downstream optical transmission devices; and
a controller configured to control gain wavelength characteristics of the optical transmission device on the basis of the received gain wavelength characteristic information, wherein:
the controller makes the optical transmission device have a primary slope of the gain wavelength characteristics that cancels a total of gain wavelength characteristics of optical amplifiers in the downstream optical transmission devices.

8. The optical transmission device according to claim 7, wherein:
the receiver receives the gain wavelength characteristic information of the optical amplifier from the downstream optical transmission devices placed between the receiver and a next optical transmission device having a function of controlling gain wavelength characteristics.

9. The optical transmission device according to claim 7, wherein:
the controller controls the gain wavelength characteristics of the optical transmission device so that the total of the gain wavelength characteristics of the optical amplifiers in the downstream optical transmission devices and at least one of stimulated Raman scattering and wavelength dependent loss occurring on a downstream transmission line are cancelled collectively.

10. The optical transmission device according to claim 7, wherein:
the receiver receives, through an optical supervisory channel, the gain wavelength characteristic information of the optical amplifier in each of the downstream optical transmission devices.

11. The optical transmission device according to claim 7, wherein:
the controller includes an optical demultiplexer configured to demultiplex a wavelength-multiplexed light for each wavelength and a variable optical attenuator configured to adjust an attenuation amount of an optical signal of each wavelength.

12. The optical transmission device according to claim 7, wherein:
the controller includes a wavelength selectable switch configured to demultiplex a wavelength-multiplexed light for each wavelength and adjust loss in an optical signal of each wavelength.

13. An optical transmission device that amplifies a wavelength-multiplexed light received from a first upstream optical transmission device, and transmits an amplified light to a downstream optical transmission device, the optical transmission device comprising:
an optical amplifier configured to amplify the wavelength-multiplexed light;
a storing unit configured to store gain wavelength characteristic information of the optical amplifier; and
a transmission unit configured to transmit the gain wavelength characteristic information to a second upstream optical transmission device through an opposite transmission line, wherein:
the second upstream optical transmission device has a primary slope of gain wavelength characteristics that cancels a total of gain wavelength characteristics of optical amplifiers in a plurality of downstream optical transmission devices, on a basis of the received gain wavelength characteristic information.

14. The optical transmission device according to claim 13, wherein:
the storing unit stores a plurality of pieces of gain wavelength characteristic information corresponding to different use conditions of the optical amplifier, and the transmission unit transmits, to the second upstream optical transmission device, gain wavelength characteristic information generated by interpolating among the plurality of pieces of gain wavelength characteristic information in accordance with a current use condition.

15. A gain wavelength characteristic compensation method used for a wavelength-division multiplexing communications system including a plurality of optical transmission devices having an optical amplifier, the method comprising:
transmitting gain wavelength characteristic information of an optical amplifier in each of a plurality of downstream optical transmission devices to an upstream optical transmission device through an opposite transmission line from the downstream optical transmission devices; and
controlling gain wavelength characteristics of the upstream optical transmission device on the basis of received gain wavelength characteristic information in the upstream optical transmission device, wherein:
the controlling makes the upstream optical transmission device have a primary slope of the gain wavelength characteristics that cancels a total of gain wavelength characteristics of optical amplifiers in the downstream optical transmission devices.

* * * * *